(12) United States Patent
Nguyen et al.

(10) Patent No.: US 6,336,082 B1
(45) Date of Patent: Jan. 1, 2002

(54) METHOD FOR AUTOMATIC SCREENING OF ABNORMALITIES

(75) Inventors: Van-Duc Nguyen, Albany; Joseph Leagrand Mundy, Schenectady, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/263,348

(22) Filed: Mar. 5, 1999

(51) Int. Cl.[7] ............................................. G06F 1/00

(52) U.S. Cl. ...................... 702/179; 345/419; 340/658; 382/110

(58) Field of Search .................... 702/33–36, 40, 702/56, 81–84, 179–181, 182–183, 155, 159, 189, 65, 150–151, FOR 103, 104, 110, 123, 124, 131, 134, 135, 149, 165; 382/133, 110, 129, 276, 134, 165; 706/20, 25, 924; 700/17, 124, 223; 345/419; 367/68; 340/658

(56) References Cited

U.S. PATENT DOCUMENTS

| | | | |
|---|---|---|---|
| 5,060,290 A | * 10/1991 | Kelly et al. | 382/110 |
| 5,150,111 A | * 9/1992 | Fujieda et al. | 340/658 |
| 5,546,475 A | 8/1996 | Bolle et al. | |
| 5,668,631 A | 9/1997 | Norita et al. | |
| 5,671,344 A | * 9/1997 | Stark | 345/419 |

* cited by examiner

Primary Examiner—Hal Wachsman
Assistant Examiner—Khoi Duong
(74) Attorney, Agent, or Firm—Jean K. Testa; Donald S. Ingraham

(57) ABSTRACT

A method of detecting abnormalities including a learning phase and an inspection phase. In the learning phase, a first statistical quantity and a second statistical quantity are determined based on a first set of n-dimensional data. A second set of n-dimensional data is obtained and a bimodal distribution for a plurality of n-dimensional points in each of the second set of n-dimensional data is determined. A reference template is generated in response to the first statistical quantity, second statistical quantity and bimodal distribution. In the inspection phase, n-dimensional test data to be inspected for abnormalities is obtained and compared to the reference template to detect abnormalities.

20 Claims, 4 Drawing Sheets

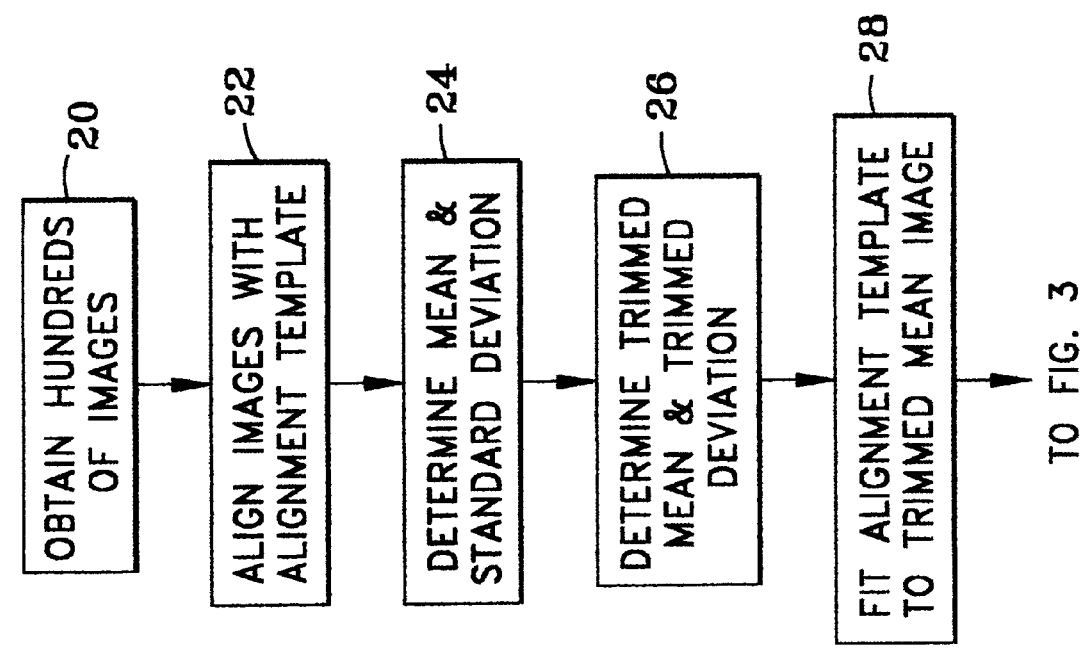
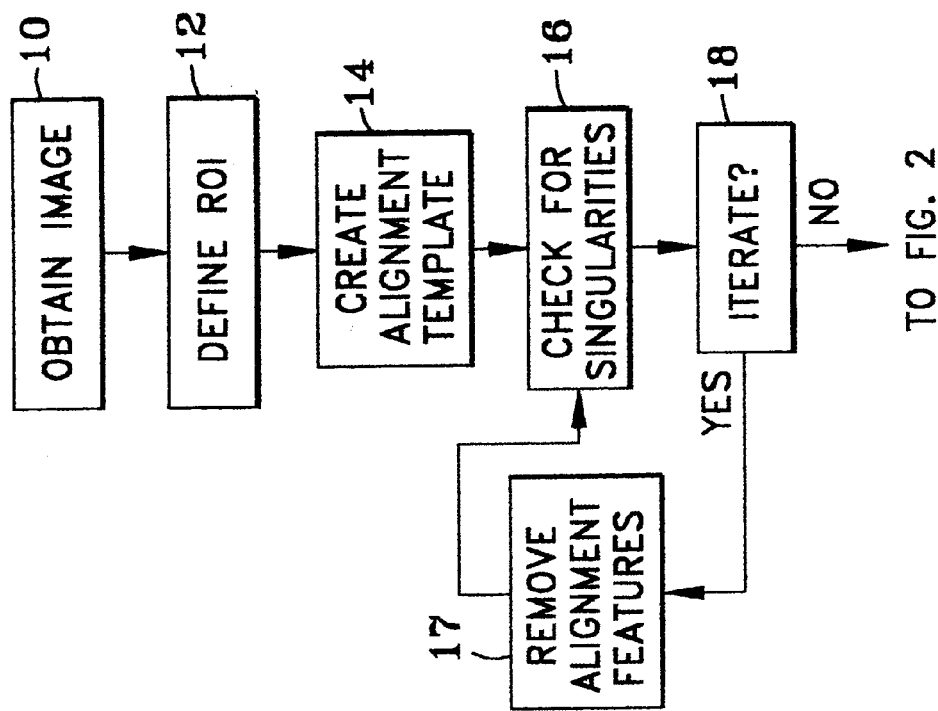

METHOD FOR AUTOMATIC SCREENING OF ABNORMALITIES

BACKGROUND OF THE INVENTION

The invention relates to a method and apparatus for screening n-dimensional data for abnormalities. One application of the invention is inspecting x-ray images of objects to detect abnormalities. Currently, x-ray inspection is performed on manufactured parts (e.g. turbine blades) to detect defects in the item. Conventional flaw detection algorithms use image processing techniques such as local fitting, convolution, or morphological operators to enhance flaws by comparing a center pixel against its neighbors. These local operators not only enhance flaws but also enhance sharp profiles such as edges of the part that are not flaws. Accordingly, the enhanced images need to be inspected visually by human operators to differentiate between a flaw occurrence and the correct part geometry. Human operators are prone to eye fatigue, and thus reduced accuracy, and fast turn over rate.

Automated visual inspection of blades in aircraft and power generation turbines must be exhaustive, fast, and flexible. Currently, this inspection task is done by human inspectors looking at 16-bit x-ray images after the images have been enhanced with a high-pass filter. Previous approaches to automatic flaw detection generally use local operators tuned to certain shapes and sizes of the flaws. The operators could be linear convolution, combination of Zernike polynomials, morphological operator, or neural network. All of these approaches detect flaws by comparing the center pixel against its neighboring pixels. This results in enhanced images that have to be visually inspected by humans because the enhancement highlights not only flaws but also other local geometries of the inspected part that have similar spatial characteristics.

Subtracting the image under test from the reference image has been used to detect flaws in printed circuit boards, integrated circuits, and x-ray images of cast parts. A band-pass filter is applied to the images and a flexible matching technique is used to warp the test image before its subtraction from the reference image. Such image subtraction requires extremely accurate registration of the two images before subtraction, and still leaves strong differences at edges and places of large tolerances.

BRIEF DESCRIPTION OF THE INVENTION

An exemplary embodiment of the invention is directed to a method of detecting abnormalities including a learning phase and an inspection phase. In the learning phase, a first statistical quantity and a second statistical quantity are determined based on a first set of n-dimensional data. A second set of n-dimensional data is obtained and a bimodal distribution for a plurality of n-dimensional data points in each of the second set of n-dimensional data is determined. A reference template is generated in response to the first statistical quantity, second statistical quantity and bimodal distribution. In the inspection phase, a test set of n-dimensional data to be inspected for abnormalities is obtained and compared to the reference template to detect abnormalities.

BRIEF DESCRIPTION OF THE DRAWINGS

Referring now to the drawings wherein like elements are numbered alike in the several Figures:

FIGS. 1–3 are flowcharts depicting a learning phase;

DETAILED DESCRIPTION OF THE INVENTION

The invention detects abnormalities in n-dimensional data. The n-dimensional data may be from a variety of sources such as x-ray, CT, MRI, ultrasound, etc. A description of the invention is provided with respect to x-ray images but it is understood that the invention may be applied to other modalities.

Figure 3:
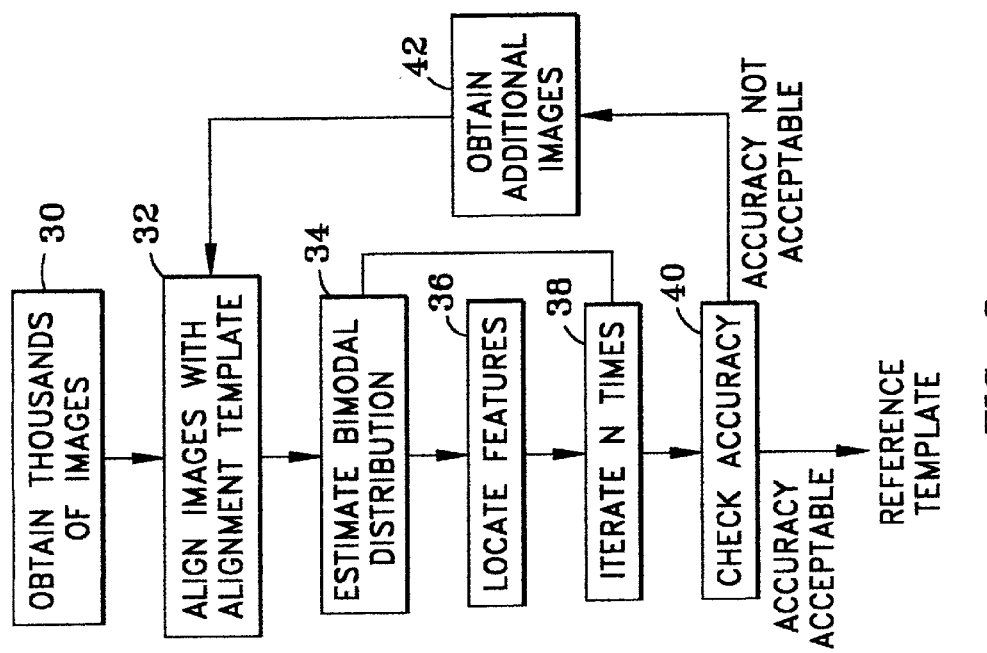

The method of inspecting x-ray images in an exemplary embodiment of the invention is divided into two phases; a learning phase and a detection phase. FIGS. 1–3 depict the learning phase. FIG. 1 illustrates steps for generating an alignment template that is used to register all the images during the learning phase. At step 10, an image is obtained that will serve as the alignment template. The image may be an original x-ray image of a defect free object or a mean image formed by averaging several defect free images.

At step 12, a region of interest (ROI) is defined. The user can define the ROI through an input device (e.g. a mouse). The ROI should preferably be generally square (e.g. aspect ratio should not be less than ½ or ⅓). The ROI defines the portion of the x-ray images that will be inspected for defects. At step 14, the alignment template is created by selecting features in the ROI to be used for later alignment of images. Straight, step segments may be chosen for affine registration in the x-y plane; flat patches may be selected for the linear regression along the z axis. A gradient filter may be used to locate the step segments and the flat patches.

Once the alignment features (e.g. straight steps and flat patches) are defined, the alignment template is checked for singularities in the global alignment at step 16. A covariance matrix (described in detail below) is used to describe the uncertainties in determining affine parameters. At step 18, the user can iterate step 16 to refine the alignment template by removing or displacing features at step 17 to remove singularities. The user can examine the eigenvalues associated with translation and rotation in three dimensions and remove alignment features so that the eigenvalues exceed a predetermined value. The user can remove features away from known areas in the image having large variations. Areas having large variation will not serve as accurate features for registration. Once the alignment template is optimized, flow proceeds to step 20 in FIG. 2.

FIG. 2 depicts a process for determining a mean and deviation for features in the image. At step 20, hundreds of good images are obtained. Good images refers to defect free images or images having a defect rate below a certain amount (e.g. 1/100). At step 22, each image obtained in step 20 is aligned with the alignment template derived using the process in FIG. 1. The steps used to align the images are described in detail herein. At step 24, the mean and standard deviation is determined for every pixel in the ROI over the hundreds of images. The calculations for determining the mean and standard deviation are described in detail herein. At step 26, the process determines the trimmed mean and trimmed deviation for every pixel in the ROI as described herein. At step 28, the alignment template is fit to the trimmed mean image. This is done by processing the trimmed mean image to locate alignment features. The processing may be done using a gradient filter as described above to locate steps and flat patches in the mean image. The alignment template can then be fit to the trimmed mean image.

The final portion of the learning phase is depicted in FIG. 3. The x-ray image may include overlapping features such as holes two sets of drilled holes projecting onto the same pixels. Overlapping features result in bimodal distributions. The standard deviation would be over-estimated if the sample set is fit to one single mode. Thus, each pixel needs to be estimated as a bimodal distribution. At step 30, thousands of defect free images are obtained. Each image is aligned with the alignment template at step 32. At step 34, the bimodal estimation is performed for each pixel in the thousands of images. The bimodal estimation generates a mean value for each pixel and is described in detail below. At step 36, features (steps and flat patches) on the mean image produced in step 34 are located by, for example, use of a gradient filter. Step 38 iterates steps 34 and 36 several times (e.g. 3–5) until a statistically reliable reference template is generated. The reference template is a template of step segments and flat patches aligned to the expected x-ray surface where each pixel in the reference template is assigned a mean and a standard deviation and is estimated by a bimodal distribution. Lastly, at step 40, the sub pixel accuracy of the reference template is checked. If the sub-pixel accuracy is insufficient, then more images can be obtained at step 42 and processed over additional iterations until the desired sub-pixel accuracy is obtained.

Figure 4:
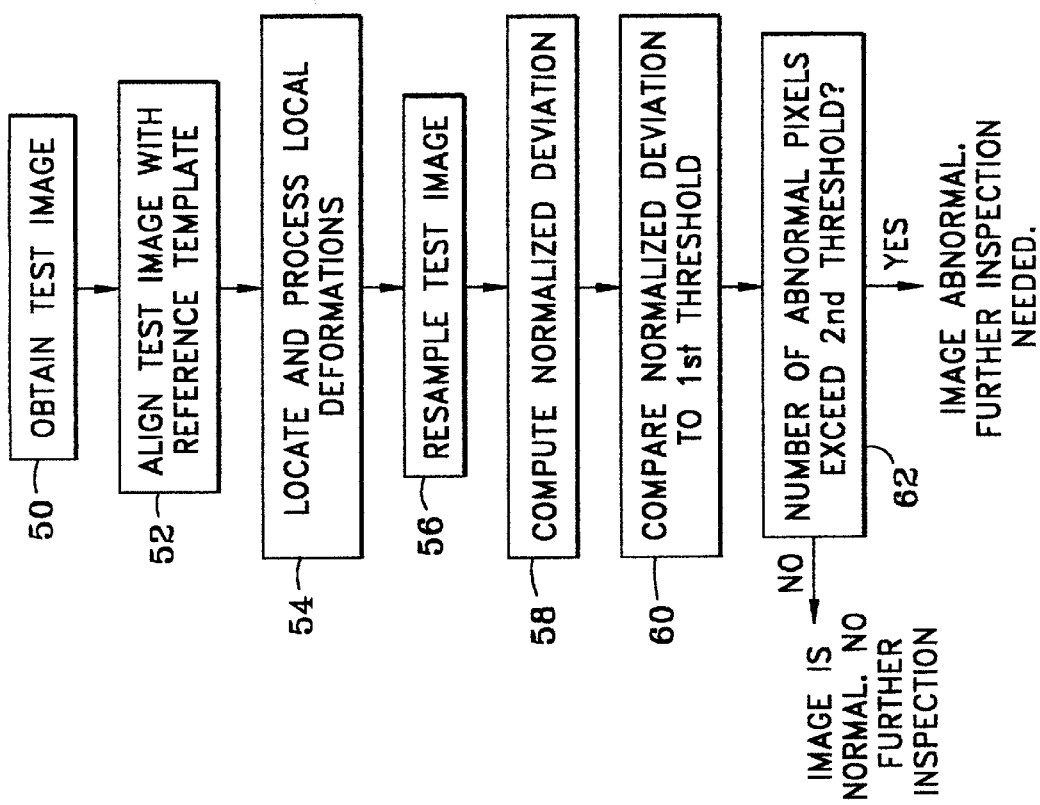
FIG. 4 is a flowchart depicting an inspection phase.

Once the reference template is generated, test images can be acquired and compared with the reference template to detect abnormal pixels. FIG. 4 is a flowchart depicting the process of inspecting a test image for abnormalities. At step 50, the image to be inspected, or test image, is obtained. The test image is preferably taken from the same vantage as the images used to form the reference template. At step 52, the inspection image is aligned with reference template. The inspection image and the reference template are aligned to sub-pixel accuracy using the reference template alignment features (e.g. straight step segments and flat patches). This compensates for small deviations in object pose, view geometry, and sensor temperature. The alignment step is described in detail below. Once the test image is aligned, it may be re-sampled. At step 54, local deformations are located and processed in order to compensate for independent shifts in local features because of different manufacturing operations and manufacturing tolerances. The processing of local deformations is described in detail below. The test image is then re-sampled at step 56 with bilinear interpolation. Each pixel in the test image is now uniquely associated with the reference template.

At 58, a normalized deviation is determined for each pixel in the inspection image using the nearest mode in the distribution. Normalizing each pixel based on one mode in an estimated bimodal distribution compensates for pixels representing overlapping features. The depth of material at each pixel is subtracted from its mean and normalized by its standard deviation. Computation of the normalized deviation is described in detail below. The normalized deviation for each pixel is compared to a first threshold at 60. If the normalized deviation exceeds the threshold, the pixel is classified as abnormal. A first threshold of 5 generates results comparable to normal human operators, and is found by heuristically comparing screening and operator results for 50,000 images containing a catalog of 400 flaws. At step 62, it is determined if the number of abnormal pixels exceed a second threshold. If so, the image is forwarded to a human operator for further analysis and/or inspection. If not, the image is considered good. A threshold of 3 pixels may be used in step 62, which corresponds to the current size tolerance of a single flaw.

All detectable flaws must result in abnormal pixels if normal process variations are accurately learned at each pixel. The reverse is not true. Not all abnormal pixels are flaws. Generally, less than 1% of the abnormalities are real flaws, and deducing a flaw requires reasoning about the manufacturing process. The majority of the abnormal pixels are caused by large differences in tolerance at different features in the object. The screening can be done in ¼ second for an inspection area of 100×200 pixels, on a 200 MHz PC. It can be made as sensitive as the most expert, human inspector by using a threshold of 4, or by increasing the image resolution and signal to noise ratio. A first threshold of 5 and a second threshold of 3 pixels is comparable to regular human inspectors.

Portions of the process depicted in FIGS. 1–4 will now be described in further detail. Both the learning phase and the inspection phase rely upon aligning images. The process for aligning images is described in detail with reference to FIGS. 5–10. The x-ray images processed by the present invention represent three-dimensional surfaces. For efficiency and simplicity, the alignment of these three-dimensional surfaces is split into a two-dimensional affine transformation in the x-y plane and a one-dimensional linear regression along the z-axis. Point landmarks such as corners and junctions are avoided. Instead, straight step segments and flat patches are used for their accuracy and stability.

Figure 5:
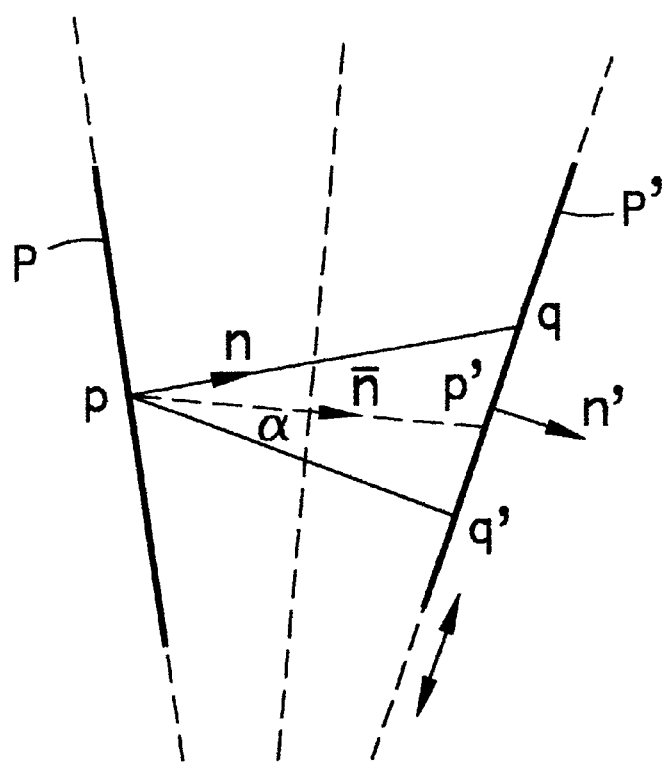
FIG. 5 illustrates the alignment of two linear segments.

FIG. 5 depicts straight segments P and P' to be registered. Segment P is from a reference template and has a midpoint p and normal n defined a priori. Segment P' is from a test image and is part of a larger straight curve with normal n'. Since the local segment P' has no detectable boundaries or landmarks, its midpoint p' can not be found by local feature detection and matching. Instead, the location p' corresponding to point p is constructed to be the projection of p onto the infinite line supporting segment P', along the average normal $\bar{n}$ $$\bar{n} = \frac{n+n'}{\|n+n'\|} = \frac{n+n'}{2\cos(\alpha/2)} \quad (1)$$

$$\alpha = \arcsin("n \wedge n'").$$

The average of the two normals is meaningful if $n^T n' > 0$, which formalizes the assumption of rough alignment. Instead of constructing p' based on the average normal $\bar{n}$, intersection points q and q' can be constructed by projecting p along the normal n and n' respectively. All three are related, so the distance measure between a model segment P and a data curve containing segment P' can be constructed as:

$$d(P, P') = (p' - p)^T \bar{n} \quad (2)$$

$$= ((q - p)^T n)(\cos\alpha/\cos(\alpha/2))$$

$$= ((q' - p)_T n')/\cos(\alpha/2).$$

The following approximate normal distance is used to avoid estimating the local normal from discrete contours:

$$d(P,P') \approx (q-p)^T n \quad (3)$$

Figure 6:
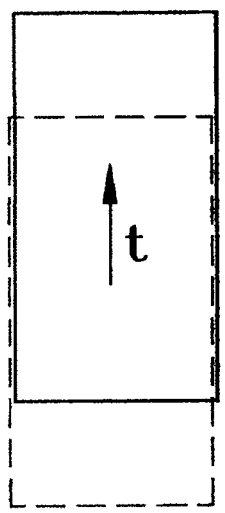
FIG. 6 depicts translation of an object.
Figure 7:
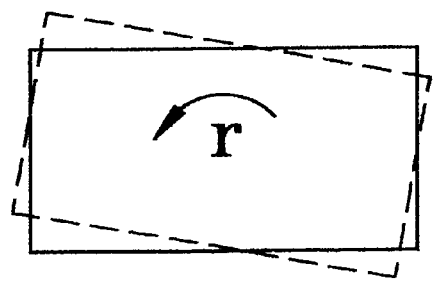
FIG. 7 depicts rotation of an object.

Note that the segment P' is free to translate tangentially to its curve. Minimizing the normal distance between point and curve leads to much faster convergence to the final pose than minimizing the Euclidean distance between model and matched points. FIGS. 6 and 7 illustrate examples of translation and rotation to achieve alignment. The translation and rotation of a rectangle requires only one instead of many registration iterations (matching and pose refinement) if Euclidean point distances are used. The convergence in the translation example is at best quadratic, because Euclidean point distance restricts tangential sliding of the matching segments, leading to not only slow convergence but also multiple weak minima near the global minimum error.

The processes performed in the two-dimensional affine transformation are decomposed in translation $(t_x, t_y)^T$, stretching $(s_{xx}, s_{yy})^T$, and skewing $(s_{xy}, s_{yx})$ terms. Rotation is a combination of skewing and stretching as shown below.

$$p' = \begin{pmatrix} 1+s_{xx} & s_{xy} \\ s_{yx} & 1+s_{yy} \end{pmatrix} p + \begin{pmatrix} t_x \\ t_y \end{pmatrix} \quad (4)$$

$$= (I+S)p + t$$

If the terms in S are assumed small enough to discard second order terms, the transformation I+S can be split in half, such that:

$$I+S \approx (I+S/2)(I+S/2)$$

$$I+S/2^{-1} \approx (I-S/2) \quad (5)$$

Using the approximate normal distance given by equation (3), the minimization of the squared normal distances between model and data segments becomes:

$$\min_{S, t''} \sum_i [((-S/2)q_i - (I+S/2)p_i - t'')^T n_i]^2 \quad (6)$$

with the full translation related as:

$$t = (I+S/2)t\Delta \quad (7)$$

The mid points p and q of the model and data segments are transformed halfway toward each other, respectively by $(I+S)/2$ and $(I-S)/2$, so that their difference will align with the average normal $\bar{n}$.

The translation, stretching, skewing terms are solved directly with singular value decomposition on a 6×6 linear system:

$$\left( \sum_i V_i V_i^T \right) x = \sum ((q_i - p_i))^T n_i V_i \quad (8)$$

where $$x = (t''_x, t''_y, S_{xx}, S_{yy}, S_{xy}, S_{yx})^T$$

$$V = (n_x, n_y, n_x r_x, n_y r_y, n_x r_y, n_y r_x)^T$$

$$r = (q+p)/2.$$

Figure 8:
FIGS. 8–10 depict configurations of line segments for determining translation, stretching and skewing.
Figure 9:
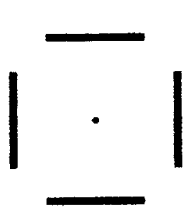
Figure 10:
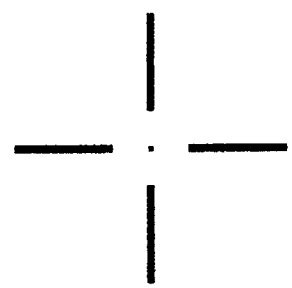

The covariance matrix describing the uncertainties in determining the affine parameters is $(\Sigma V_i V_i^T)^{-1}$. FIGS. 8–10 show the configurations of the line segments for determining translation, stretching, and skewing parameters. This figure is a useful guide for the user in picking new line segments to improve the accuracy of specific affine parameters. The matching of line segments is done locally by a bounded search in the xyz space, for nearest and similar step in the same direction.

The inspection image is assumed to globally fit the reference template surface. The only allowed differences are local shifts in xy-plane at strong steps because of small core shifts. Core shifts along z-axis do not change the total thickness of metal that the x-ray beam penetrates.

As indicated in step 54, local deformations are located and processed to account for manufacturing tolerances. Assuming independent and random errors in location (x, y) and in measuring thickness z at any pixel, the measured thickness z' written as a Taylor expansion depends on all errors:

$$z' = <z> + n(z) + \nabla z \cdot \delta p + O(\text{``}\delta p\text{''}^2) \quad (9)$$

where $n(z)$ is the random noise from sensors, $\delta p$ is the displacement vector in the xy-plane, and $\nabla z = (\delta z/\delta x, \delta z/\delta y)$ is the local gradient. The local displacement vectors $\delta p$ at strong steps can be estimated along the gradients $\delta z$, then bounded in magnitude by the allowed manufacturing tolerance, and finally smoothed with a Gaussian to avoid high frequency variations. Since the displacement vector field has no global consistency, interpolation is not done at flat patches or small slopes. Experiments show that by bounding the magnitude of strong steps by the allowed manufacturing tolerance, false positives are reduced by 2–5%. There is a slight reduction in the ability to detect flaws if the flaw boundary is close to a strong step in the reference template.

The reference template and the inspection image must also be registered in the z dimension. All sharp step edges in the inspection image will match to their counterparts in the reference template after re-sampling with bilinear interpolation using the global affine transformation and local deformations described above. The intensity along the z-axis may still not match because of heat fluctuations in the imaging sensors. The offset a and slope b of the linear regression between inspection image intensity z' and reference template intensity z are found from minimizing:

$$X^2(a,b) = \sum_{i=1}^{n} \left( \frac{Z'_i - a - b Z_i}{\sigma_i} \right)^2 \quad (10)$$

where $\sigma$ is the measurement uncertainty. At flat patches, $\sigma$ is minimal and tends to the standard deviation caused by random sensor noise. After z-registration, the normalized residuals for a good part are random, except for weak patterns because of pixel correlations from large local features.

Details of the learning phase shown in FIGS. 1–3 will now be described. For the inspection phase to be performed accurately, the reference template must correspond to a known good part. Even though CAD/CAM and tolerance data are available, it is hard to predict variations from one part to the next. X-ray imaging compounds the problem with complex push-broom projections, scatterings and saturations. Manufacturing processes have unpredictable variations because of tool wear and tooling changes. All of these unpredictable variations can be learned from hundreds to thousands of samples, by estimating the peak and width of one or two main modes in the distribution, and doing that at every pixel in the inspection area as described herein.

Variations from one image to the next have two components, namely random noise and process variation. Random noise is produced by x-ray scattering, sensor hardware, etc. This component is constant and does not vary with pixel location. Process variance varies based on pixel location (e.g. depending on whether the pixel is near a drilled hole, a casting feature, etc.). Both variations are assumed random, independent and normally distributed with zero mean. Accordingly, the distribution at each pixel is well approximated by a Gaussian described by its mean and standard deviation. However, this approximation is valid only if the number of samples is very large compared to the number of tail events and outliers. The Gaussian model predicts such a small probability for these tail events and outliers, that a few flaws or systematic errors will distort the Gaussian bell-shaped curve for better least-square-error fit at the tails.

Figure 11:
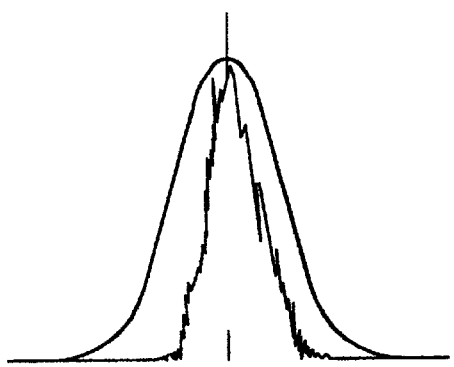
FIG. 11 is a distribution having a cluster of outliers.
Figure 12:
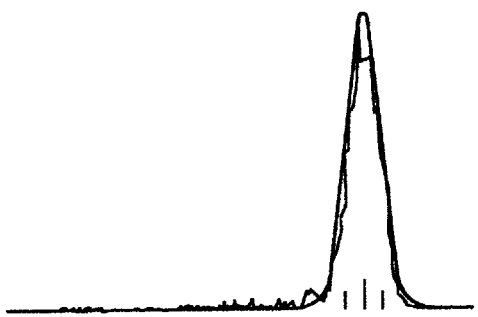
FIG. 12 is a distribution having a uniform tail.
Figure 13:
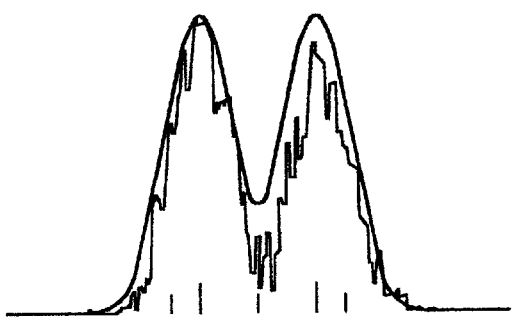
FIG. 13 is a bimodal distribution.

Typical distributions are shown in FIGS. 11–13. FIG. 11 shows a distribution having small clusters of outliers and depicts the mean and standard deviation. Examples of outliers are places of frequent over-drilling and/or under-drilling. Outliers are few but can be as far as 30σ from the mean. As a result of the outliers, FIG. 11 shows a large overestimate of the standard deviation.

FIG. 12 shows a distribution having a uniform tail and depicts the median and mean deviation. An example of a part having a distribution such as that shown in FIG. 12 is a tip cap, where the core meets the outside molds. This tip cap is impossible to get accurate from casting alone, and so is formed with extra material, so that it can be trimmed off later at high precision. The extra material contributes to the uniform tail shown in FIG. 12.

FIG. 13 shows a bimodal distribution depicting the mean. Examples of areas which generate bimodal distributions are areas where two distinct columns of drilled holes overlap in the x-ray image or areas near boundaries of drilled holes.

As described above, the learning phase shown in FIGS. 1–3 uses the mean and standard deviation of the pixel intensity distribution. The mean depends on the first moment of the data:

$$\langle z \rangle = \frac{1}{n \sum_{i=1}^{n} z_i} \tag{11}$$

while the variance and thus the standard deviation depends on the second moment of the data:

$$\sigma^2 = \frac{1}{n-1} \sum_{i=1}^{n} (z_i - \langle z \rangle)^2. \tag{12}$$

Lower order moments are used to obtain more robust estimation of the central peak and width of the distribution. The median is used in place of the mean to estimate the center value of the distribution, as it involves only counting, or zeroth moment. The median is iteratively searched using:

$$\langle z \rangle = \frac{\sum_{i=1}^{n} \frac{z_i}{|z_i - \langle z \rangle|}}{\sum_{i=1}^{n} \frac{1}{|z_i - \langle z \rangle|}} \tag{13}$$

in O(log(n)) passes, with bracketing and bisection search techniques. This search takes about 6 sequential passes over the data for a one percent accuracy in the number of samples above and below the median value. The median can tolerate up to a breakdown point of 50% outliers of infinite deviation, and so is most robust. By comparison, the mean has a breakdown point of 1/n, since one outlier is enough to shift the location of the mean. However, the median is a less efficient estimator than the mean. A more efficient estimator is the 2β-trimmed mean, in which the nβ smallest and nβ largest samples are discarded before computing the mean of the remaining n(1−2β) samples.

The mean absolute deviation depends only on the first moment of the data, and so can be used in place of the standard deviation to estimate the width of the distribution:

$$\sigma = \sqrt{\frac{\pi}{2}} \frac{1}{n} \sum_{i=1}^{n} |z_i - \langle z \rangle| \tag{14}$$

where $\sqrt{\pi/2}$ is the normalization coefficient in case of an ideal Gaussian distribution.

The mean absolute deviation is an efficient estimator, but its breakdown point is still 1/n, and so it is not as robust to outliers of unbounded deviations as the median. The median of absolute deviations has the highest breakdown point (50%), but is also the least efficient estimator. For efficiency, the 2β(-trimmed standard deviation or the 2β-trimmed mean absolute deviation are used instead.

As described above with reference to FIGS. 1–3, the learning phase includes estimating the bimodal distribution for each pixel in thousands of images. This involves estimating the location and width (or standard deviation) of two principal modes in each distribution, while excluding strong tails and outliers. It is assumed that there are two independent and equal modes. The mid point of the two modes can be estimated by the median, which depends on the zeroth moment. The common width and the separation of the two modes can be deduced from the 2β-trimmed mean absolute deviation, and the 2β-trimmed standard deviation, which depends respectively on the first and second moments. A lookup table may be pre-computed for the case of two equal Gaussian distributions, at separations that are multiples of their common width σ. Using this lookup table, bimodal distributions are directly estimated from trimmed first and second moments.

The inspection phase shown in FIG. 4 will now be described in additional detail. Detecting a flaw requires first finding an abnormal deviation, then reasoning and classifying the abnormal deviation into known flaw types. To reason and classify flaws requires knowledge about the manufacturing processes which is hard to acquire, represent, and use effectively. Accordingly, instead of detecting flaws, the present invention finds all abnormalities, which includes all flaws.

As described above, the inspection phase uses a normalized deviation to detect abnormalities. The deviation of the measured intensity from its expected mean, normalized by its expected standard deviation is a good measure of abnormality. Let the normalized deviation be d, then the probability of flaws with normalized deviations greater than or equal to threshold is:

$$\text{prob}(d \geq \delta) = 1 - \frac{1}{\sqrt{2\pi}} \int_{-\delta}^{\delta} e^{\frac{-t^2}{2}} dt. \tag{15}$$

This ideal probability converges to zero faster than exponentially in the normalized threshold δ, i.e. prob(d≧δ)=o(c^δ)

where c is a constant. In reality, the measured probability converges to zero linearly, for δ>3.

An image is called out for a more elaborate visual inspection and flaw characterization if there exists an abnormality with an area of 3 or more pixels. The probability for such image to be declared abnormal can be estimated using cumulative binomial probability:

$$I_p(k, n-k+1) = \sum_{j=k}^{n} \binom{n}{j} p^j (1-p)^{n-j} \quad (16)$$

where k=3 is the area threshold, n is the number of pixels in the inspection region, and p is the probability given in equation (15). The two thresholds δ=5 and k=3 controls the sensitivity of the screening in terms of strength and spatial extent. They should be chosen as small as possible.

As described above, the reference template should represent a defect free part with sub-pixel accuracy. Assuming independent deviations along each of the x, y, and z axes, equation (9), their variances add:

$$\sigma^2 = \sigma_n^2 + \frac{1}{n-1} \sum_{i=1}^{n} (\|\nabla_z\| \|\delta p_i\| \cos\theta)^2 \quad (17)$$

$$= \sigma_n^2 + \frac{1}{2} \|\nabla_z\|^2 \sigma_p^2$$

$$\sigma_p^2 = \frac{1}{n-1} \sum_{i=1}^{n} \|\delta p_i\|^2$$

where $\sigma_n^2$ is variance of sensor noise n(z) or variance of pixel along z-axis, and $\sigma_p^2$ is variance of pixel in the xy-plane. The factor ½ comes from the average of cos2(θ), assuming equal probability for all angle θ between the gradient $\nabla z$ and the displacement vector $\delta p^i$. Using equation (17), the standard deviation of pixel location, $\sigma_p$, can be estimated at strong steps, and the standard deviation of sensor noise, $\sigma_n$, can be estimated at flat patches. These standard deviations are used as measure of pixel inaccuracy.

The measured $\sigma_p$ varies from ⅕ pixel for features invariant to the core, to ¼ pixel for drilled holes. The measured $\sigma_n$ varies from 1/10 pixel near the center of the inspection area, increasing linearly to ⅕ pixel at the image boundary. There is enough accuracy to find distributions and flaws at each pixel, because σ=⅕ pixel means a mis-registration probability of 5.7* $10^{-7}$.

The invention has been applied to detecting flaws in turbine blades and may prove useful in detecting at least the following types of flaws. It is understood that the invention may be applied to different objects and detect a variety of flaws not identified herein.

Over-drill, under-drill, and scarf flaws—exposure time and intensity of a laser beam are hard to control as are the drilling extents. Over-drill and under-drill flaws show up as extra or missing blobs at the end the drilling path.

A scarf is an over-drill with the drilling path tangent to the local surface. Over-drills and scarf flaws reduce the wall thickness, leading to structural failure. Under-drills disrupt the desired air flow and cooling.

Laser splatter and laser splash flaws—the metal melted by the laser beam is usually encased by the wax that fills the cavities, but it can fly away and stick to the walls of the cavities in the shapes of a splatter or a splash. A splash is harder to detect than a splatter because it is a very thin coat of metal, with a faint and irregular boundary. This laser splatter or splash can break apart from the walls because of extreme heat and centrifugal forces, and get into other sensitive parts of the turbine.

Casting defects and core shift flaws—a change in metal density or wall thickness during casting shows up as a very gradual change in the x-ray intensity, over a large region. Casting defects can weaken the walls of the blade. They result typically from incorrect location of the core, excess wax on the molds, or from abnormal cooling of the part.

Shot peen flaws—the outside surface of the turbine blade is scraped with compressed air mixed with small metal beads for higher tensile strength. These metal beads, called shot peens, are very small; on the order of 1–2 pixels in diameter, and 3–4σ in deviation, are currently missed by the automatic screening.

These shot peens can be detected only by very experienced operators, and only against a flat surface, because they are blended in the texture of the high-pass image. These shot peens are much better enhanced with normalized deviation than with high-pass filter, because the local process variation is usually very small.

Dents—dents to the outside surface are usually caused by dropping the blade.

Foreign objects—small wires are inserted into holes to check for connectivity with the internal cavities. These wires could be broken and pieces be left in the cavities, even after flushing with high pressure air.

Dwell and merge flaws—these occur within the drilled holes. A dwell is a local increase in drill diameter. A merge is an intersection of two distinct drill holes.

Unlike spatial filtering which compares the center pixel with its neighbors, an exemplary embodiment of the invention compares each pixel to its normal distribution learned from defect free samples. The parallel is to use learned experience to judge whether the pixel is a flaw because it is abnormal, or the expected value, or normal variation from this expected value. Enhancing flaws based on abnormality is a powerful paradigm, and it leads to detection of all the flaws identified above, including the most elusive to the human eye: laser splashes, core shifts, and casting defects.

Tests have been done with 3 turbine blade models and from a total of 6 different views. The screening has shown better and more consistent performance than regular operators who are prone to eye fatigue. False positives were found to occur in about 5–15% of the total number of images. Most of the false positives are caused by inconsequential shifts of the drill holes, on the top and bottom edges of the blades. However, about one quarter of these false positives are real flaws not currently detected by operators, such as casting defects and dents. False negatives occur in about 0.53% of the total number of images. Most of the false-negative images contain a flaw of 1–2 pixels which can be identified only by expert operators. About 0.97% of all images contain real flaws identified by the screening as 6–22σ, but are missed by the operators in normal working conditions. The flaws in these operator-miss images are usually low contrast splatters or over-drills.

The inspection process may be applied to other applications and modalities. An exemplary embodiment of the inspection process requires several conditions. First, the image should have invariant geometry, so that registration and correspondence are solved accurately by a simple linear transformation. A homogeneous material is needed so that flaws can be found at pixel level without complex grouping or texture analysis. A large signal-to-noise ratio is beneficial, so that process variation is much greater than sensor noise. Lastly, a large number of samples is needed so that bimodal distributions can be estimated robustly. The above requirements usually hold for parts that are non flexible and non composite, such as metallic parts or integrated circuit boards. Additional steps such as handling texture and deformation could lead to applying the invention to robust screening of mammograms.

Although an embodiment of the invention has been described with respect to x-ray images, it is understood that it may be applied to any n-dimensional data set. The n-dimensional data set is made up of n-dimensional points having one or more characteristics. For example, an x-ray image is a two-dimensional data set with two-dimensional points (pixels) having a characteristic (intensity). The statistical processing is performed on the characteristic of the n-dimensional point. In the x-ray image example, the mean and standard deviation relate to pixel intensity. Similar processing may be performed on other types of data such as MRI, CT, ultrasound, etc. Accordingly, the invention can be generalized to n-dimensional data sets made up of n-dimensional points having a characteristic.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of detecting abnormalities in n-dimensional data comprising:
    a learning phase including:
        obtaining a first series of n-dimensional data;
        determining a first statistical quantity and a second statistical quantity based on said first series of n-dimensional data;
        obtaining a second series of n-dimensional data;
        estimating a respective bimodal distribution for a plurality of n-dimensional points in each of said second series of n-dimensional data;
        generating a reference template in response to said first statistical quantity, said second statistical quantity and said respective bimodal distributions; an inspection phase including:
            obtaining n-dimensional test data to be inspected for abnormalities; and
            comparing said test data to said reference template to detect abnormalities.

2. The method of claim 1 wherein said first statistical quantity is a mean.

3. The method of claim 1 wherein said first statistical quantity is a median.

4. The method of claim 1 wherein said first statistical quantity is a 2β-trimmed mean.

5. The method of claim 1 wherein said second statistical quantity is a standard deviation.

6. The method of claim 1 wherein said second statistical quantity is a mean absolute deviation.

7. The method of claim 1 wherein said second statistical quantity is a 2β-trimmed standard deviation.

8. The method of claim 1 wherein said second statistical quantity is a 2β-trimmed mean absolute deviation.

9. The method of claim 1 wherein said comparing includes:
    determining a normalized deviation for a plurality of n-dimensional points in said test data; and
    comparing said normalized deviation to a first threshold to detect abnormal points.

10. The method of claim 9 wherein said comparing further comprises:
    counting a number of abnormal points;
    comparing the number of abnormal points to a second threshold; and
    classifying said test data as containing an abnormality if the number of abnormal points exceeds said second threshold.

11. A storage medium encoded with machine-readable computer program code for modeling an object comprising instructions for causing a computer to implement a method comprising:
    a learning phase including:
        obtaining a first series of n-dimensional data;
        determining a first statistical quantity and a second statistical quantity based on said first series of n-dimensional data;
        obtaining a second series of n-dimensional data;
        estimating a respective bimodal distribution for a plurality of n-dimensional points in each of said second series of n-dimensional data;
        generating a reference template in response to said first statistical quantity, said second statistical quantity and said respective bimodal distributions; an inspection phase including:
            obtaining n-dimensional test data to be inspected for abnormalities; and
            comparing said test data to said reference template to detect abnormalities.

12. The storage medium of claim 11 wherein said first statistical quantity is a mean.

13. The storage medium of claim 11 wherein said first statistical quantity is a median.

14. The storage medium of claim 11 wherein said first statistical quantity is a 2β-trimmed mean.

15. The storage medium of claim 11 wherein said second statistical quantity is a standard deviation.

16. The storage medium of claim 11 wherein said second statistical quantity is a mean absolute deviation.

17. The storage medium of claim 11 wherein said second statistical quantity is a 2β-trimmed standard deviation.

18. The storage medium of claim 11 wherein said second statistical quantity is a 2β-trimmed mean absolute deviation.

19. The storage medium of claim 11 wherein said comparing includes:
    determining a normalized deviation for a plurality of n-dimensional points in said test data; and
    comparing said normalized deviation to a first threshold to detect abnormal points.

20. The storage medium of claim 19 wherein said comparing further comprises:
  counting a number of abnormal points;
  comparing the number of abnormal points to a second threshold; and
  classifying said test data as containing an abnormality if the number of abnormal points exceeds said second threshold.

* * * * *